United States Patent

Hildebrant et al.

[15] 3,685,347

[45] Aug. 22, 1972

[54] SQUIB SWITCH SIMULATOR

[72] Inventors: Floyd J. Hildebrant, Andover; John J. Chovanec, Dover, both of N.J.

[73] Assignee: The United States of America as represented by the Secretary of the Army

[22] Filed: Aug. 30, 1971

[21] Appl. No.: 175,848

[52] U.S. Cl. ................................................. 73/35
[51] Int. Cl. .......................................... G01n 33/22
[58] Field of Search ............................... 73/35, 167

[56] References Cited

UNITED STATES PATENTS 2,920,479  1/1960  Kane ........................... 73/35

Primary Examiner—James J. Gill
Attorney—Harry M. Saragovitz et al.

[57] ABSTRACT

A squib switch testing apparatus for evaluating the switch parameters which includes a support stand for holding the specimen switch assembly above an interface plate with the switch piston abutting the plate. A generally cylindrical rubber-like washer of a predetermined durometer hardness is interposed between the plate and a piezoelectric transducer. The washer is provided with a central aperture within which is disposed a teflon pin that extends from the transducer to just short of the upper washer surface. Carried by the plate and extending upwardly is a displacement rod which terminates in an optical end portion that includes a narrow lengthwise slit therein. On opposite sides of the slit there is positioned a source of illumination and a photo-detector response to the quantities of light emanating from the source. Thus as the rod is depressed by the activation of the squib a quantity of light proportional to the displacement impinges on the detector whose output is applied to one channel of an oscilloscope. The squib is fired by a linear constant current pulse which is also applied to the scope. The downward movement of the squib piston initially compresses the washer while transmitting the force to the transducer and after this limited movement the pin provides for the force transmission. The transducer under displacement provides an electrical signal to the oscilloscope proportional to the force acting thereon. Thus in one operation the squib switch signature is determined and indicated.

8 Claims, 1 Drawing Figure

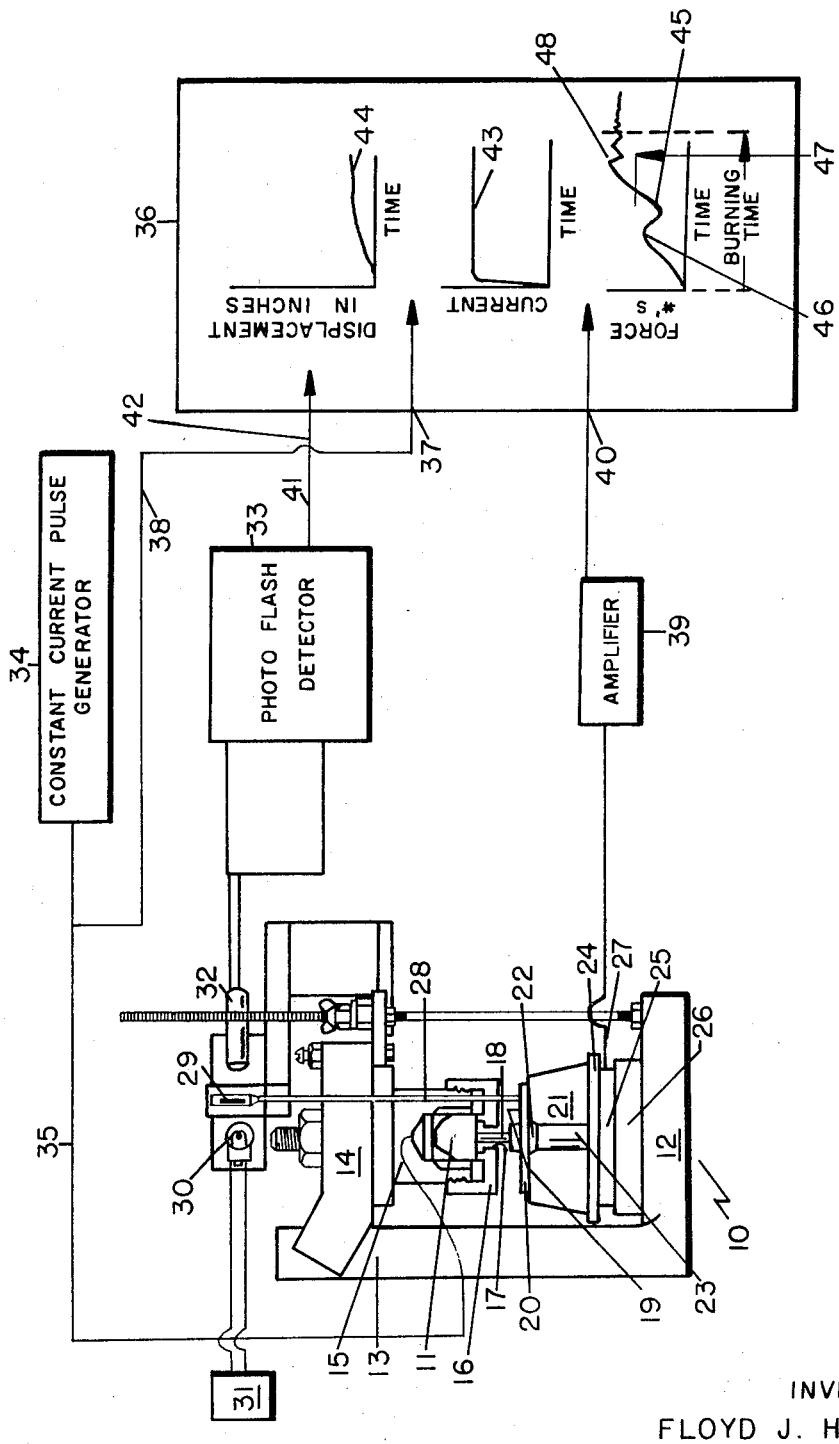

SQUIB SWITCH SIMULATOR

The invention described herein may be manufactured, used and licensed by or for the Government for governmental purposes without the payment to us of any royalty thereon.

BACKGROUND OF THE INVENTION

The present invention relates to squib switches and more particularly pertains to squib switches and to apparatus for simulating squib operation during testing to ascertain the squib signature and its overall parameters.

In the field of squib switch testing, it has been the general practice to employ a ballistic pendulum or 1 ml. bomb tests which at best are approximate and only partial evaluations. One basic difficulty encountered in such devices is that the relatively large displacement (⅛ inch) of the switch actuator makes it impossible to measure the force by a direct transducer pickup. Where the transducer is employed in conjunction with a vise the movement of the transducer is again severely restricted thus extensively reducing the accuracy. The present invention overcomes these inherent difficulties and permits force measurements to be made within the travel limits of a pressure transducer.

SUMMARY OF THE INVENTION

The general purpose of this invention is to provide a squib switch simulator that has all the advantages of similarly employed prior art devices and has none of the above described disadvantages. To attain this, the present invention provides a unique structural arrangement coupled with activation, detection and display apparatus for providing squib switch parameters. The squib switch to be evaluated is supported with its piston directed downwardly in contact with a hardened metallic plate that rests on the upper face of a generally cylindrical resilient washer. The lower washer face abuts one face plate of a piezoelectric transducer table and a plastic pin extends coaxially therethrough from the transducer plate to just short of the upper washer surface. Affixed to and extending upwardly from the hardened plate is a displacement rod whose upper free end is slit and is positioned intermediate a light source and a detector so as to permit a quantity of light to pass through dependent on the displacement of the rod. The outputs of the transducer and the detector are properly processed and applied to independent channels of an oscilloscope with the scope trigger derived from a constant current pulse source which also fires the squib. The oscilloscope displays provide a visual, instantaneous, quantitative indication of the force, burning time, ignition current, bridgewire resistance change and displacement of the squib piston.

An object of the present invention is to provide a simple, direct, economical squib switch simulator test apparatus with which the physical characteristics of various types of squib switches may be determined.

Another object is the provision of a squib switch tester which will measure the instantaneous force, displacement, and response time of the squib switch immediately after activation and which will visually indicate said parameters.

Still a further object is to provide a squib switch simulator which can be used in evaluating the parameters of both instant and delay type squib switches and which is independent of the skill of the operator.

Other objects and many of the attendant advantages of this invention will be readily appreciated as the same becomes better understood by reference to the following detailed description when considered in connection with the accompanying drawings, wherein:

The FIGURE is a side elevation of the structural portions and a block representation of the remaining elements of an embodiment made in accordance with the principle of this invention.

DESCRIPTION OF A PREFERRED EMBODIMENT

In the illustrated embodiment of FIG. 1 a support structure 10 properly positions and holds the structural elements as well as the squib assembly or switch 11 to be tested. The support includes a base 12 and an upstanding leg 13 from which laterally extends arm 14. The squib switch holder 15 depends from arm 14 and is provided with a lower portion 16 that is threaded onto the holder with the squib positioned therebetween, and has a central aperture 17 through which the actuating piston 18 extends downwardly. In the pre-firing or rest position the free end of the piston rod 18 rests on the outer face 19 of upper washer plate 20 which in turn abuts the frustro-conical resilient washer 21 which may be of a rubber composition having a preselected durometer hardness. The washer 21 is provided with a coaxial aperture 22 having disposed therein a plastic or TEFLON pin 23. The pin 23 abuts the upper pressure plate 24 of the piezoelectric transducer 25 and extends upward just short of the washer plate 20. The transducer abuts the lower fixed mass member 26 so that as pressure or force is applied to the pressure plate 24 the transducer is compressed and provides at lead 27 a voltage output relative to the pressure being applied thereto.

Affixed to the plate 20 and extending upwardly is a displacement rod 28 whose upper end is formed with a lateral extension having a narrow lengthwise slit 29. Fixedly supported on one side of the displacement rod 28 is a source of illumination such as light bulb 30 whose intensity is held constant through a voltage controlled supply 31. Aligned with and opposite therefrom is a photo-tube 32 or cell whose output is applied to a photo-flash detector 33 so that the quantity of light impinging on the tube is proportional to the electrical output of the detector. The slit 29 and the displacement rod are structurally arranged whereby in the undeflected position the rod effectively blocks the vision of the photo-tube and when displaced permits light to pass from the bulb to the tube, the quantity and duration dependent on the physical displacement of the plate 20 due to the action of the squib piston 18. The squib is electrically activated by the current derived from a constant current pulse generator 34 which provides a constant 1 ampere for one second to the squib via line 35 and also supplies the trigger input for multichannel oscilloscope 36 as well as the input to one channel 37 via lead 38. The transducer 27 output which is an extremely low amplitude signal is amplified at amplifier 39 and thereafter applied to another channel 40 of oscilloscope 36. Likewise the electrical signal from the photo-flash detector 33 is fed through line 41 into channel 42.

Summarizing the overall squib simulator operation it is clear that the process is initiated by pulsing the generator 34 which in turn fires or activates the squib switch causing the piston to be pushed against the hardened steel plate 20 by the resulting explosive force. The plate in turn compresses the rubber-like washer which transmits the force to the transducer but since the compression of the transducer is limited to approximately .010 of an inch and the typical squib piston traverses a distance of 0.120 inches, the washer while transmitting the force compresses .090 of an inch before the piston contacts the pin 23. The washer in deforming therefore, is allowed to compress a selected distance under a predetermined force by selecting its overall dimensions, and durometer hardness as well as the length of the pin confined therein. For typical squib switches of the miniature variety in simulating their full open parameters, the washer was permitted to longitudinally displace .090 inch under a force of 50 pounds to thereby limit the movement of the transducer or load cell to .004 inches prior to the pin taking up and transmitting the force. The remaining movement does not allow the transducer to be overdriven since the TEFLON pin takes up the lengthwise difference by physically compressing therealong without appreciable lateral expansion. During this period the plate moves downwardly against the washer and carries with it the displacement rod which effectively channels the light beam to the photoelectric cell that is calibrated in accordance with the actual displacement of the rod.

The resultant visual displays are illustrated at the oscilloscope 36 with the curve 43 representing the output of the pulse generator. Curve 44 indicates the squib piston displacement which attains a maximum after a very short time interval while curve 45 traces the force output of the squib first attaining a force of 50 pounds for a .090 inch displacement at 46 and then dips before it starts upward to the point of 90 percent maximum response at 47 and reaching a maximum at 48 temporarily holding thereafter due to the confined gases with the squib assembly. From this latter curve it is clear that not only are the forces acting indicated but the 90 percent point as well as the total burning time can be ascertained neither of which are determinable by any other presently known technique. Thus the total explosive force is ascertained within the travel of the pressure transducer.

It should be understood, of course, that the foregoing disclosure relates to only a preferred embodiment of the invention and that numerous modifications or alterations may be made therein without departing from the spirit and the scope of the invention as set forth in the appended claims.

We claim:

1. A squib switch simulator for determining the parameters of an explosively operated squib switch having a movable piston which comprises:
    a support means for supporting a squib switch with its piston resting on,
    a displacement, force coupling means for transmitting the force and limiting the displacement movement intermediate said piston and a
    piezoelectric transducer for providing an electrical output proportional to force applied thereto by said coupling means, and having its output connected to one channel input of
    a display means,
    electrical means connected to and for initiating of said squib, said electrical means also connected to another input channel of said display means,
    whereby said display means will indicate the instantaneous force and the electrical activation signal of said squib.

2. The simulator according to claim 1 wherein said coupling means includes:
    a cylindrical, compressible, resilient washer member having a central aperture therethrough sandwiches between
    an upper washer pressure plate and an
    upper transducer plate
    a lengthwise compressible pin disposed in said aperture having its lower end abutting said transducer plate and the opposite end extending short of said upper washer plate
    whereby when said piston is displaced said washer will be initially compressed and thereafter said pin will transmit the force applied by said piston to said transducer.

3. The simulator according to claim 2 wherein said washer is of rubber and said pin is of TEFLON.

4. The simulator according to claim 3 wherein said display means is a multiple channel oscilloscope.

5. The simulator according to claim 4 wherein said electrical means is a constant current pulse generator and provides a trigger input to said oscilloscope.

6. The simulator according to claim 5 further including means for sensing the displacement of said piston and providing an electrical signal responsive thereto, connected to still another input channel of said oscilloscope.

7. The simulator according to claim 6 wherein said displacement sensing means includes
    a source of illumination
    a detector os said illumination for providing an electrical output signal proportional to the light impinging thereon,
    opaque means disposed intermediate said source and said detector and coupled to move with said piston for varying the quantity of light in accordance with the displacement of said piston.

8. The simulator according to claim 7 wherein said opaque means includes a displacement rod having one end fixed to said washer plate and the opposite end formed with a lengthwise slit and positioned intermediate said detector and said source.

* * * * *